(12) United States Patent
Hamayde

(10) Patent No.: US 9,815,264 B2
(45) Date of Patent: Nov. 14, 2017

(54) LAMINATING

(71) Applicant: Vivid Laminating Technologies Limted, Coalville, Leicestershire (GB)

(72) Inventor: Sébastien de la Hamayde, Leicestershire (GB)

(73) Assignee: Vivid Laminating Technologies Limited, Coalville, Leicestershire (GB)

( * ) Notice: Subject to any disclaimer, the term of this patent is extended or adjusted under 35 U.S.C. 154(b) by 198 days.

(21) Appl. No.: 14/439,240

(22) PCT Filed: Jun. 23, 2014

(86) PCT No.: PCT/GB2014/000246
§ 371 (c)(1),
(2) Date: Apr. 29, 2015

(87) PCT Pub. No.: WO2014/207419
PCT Pub. Date: Dec. 31, 2014

(65) Prior Publication Data
US 2015/0290917 A1    Oct. 15, 2015

(30) Foreign Application Priority Data

Jun. 24, 2013 (GB) .................................. 1311224.8

(51) Int. Cl.
*B32B 37/22* (2006.01)
*B32B 38/00* (2006.01)

(52) U.S. Cl.
CPC ............ *B32B 37/22* (2013.01); *B32B 37/226* (2013.01); *B32B 38/0004* (2013.01); *B32B 38/0012* (2013.01); *B32B 2554/00* (2013.01)

(58) Field of Classification Search
CPC ... B32B 37/22; B32B 37/226; B32B 38/0004; B32B 38/0012; B32B 2554/00; Y10T 156/1056; Y10T 156/1062
See application file for complete search history.

(56) References Cited

U.S. PATENT DOCUMENTS 4,680,079 A * 7/1987 Tanaka ............... B26D 5/28
                                                156/353
6,213,518 B1 * 4/2001 Raming ............ B42D 15/006
                                                156/1

FOREIGN PATENT DOCUMENTS

| EP | 0225927 A1 | 6/1987 |
| EP | 0740984 A1 | 11/1996 |
| GB | 1185256 A | 3/1970 |
| WO | 2014207419 A1 | 12/2014 |

OTHER PUBLICATIONS

UK Search Report dated Oct. 15, 2014 for GB application No. 1311224.8.

* cited by examiner

*Primary Examiner* — Mark A Osele
*Assistant Examiner* — Christoper C Caillouet
(74) *Attorney, Agent, or Firm* — NK Patent Law, PLLC

(57) ABSTRACT

A line of prints has passed through a laminating machine so that a laminating film has been applied to both surfaces of the line. To enable individual prints to be torn off the laminating film is indented or perforated near to an edge of the line of prints. Tearing is then effected from the perforated edge to the other edge. The indentation or perforation of both films occurs downstream of their respective supply rolls.

16 Claims, 2 Drawing Sheets

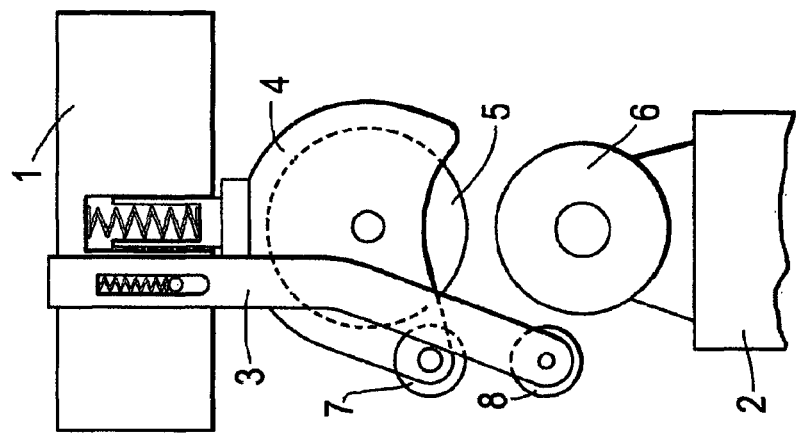
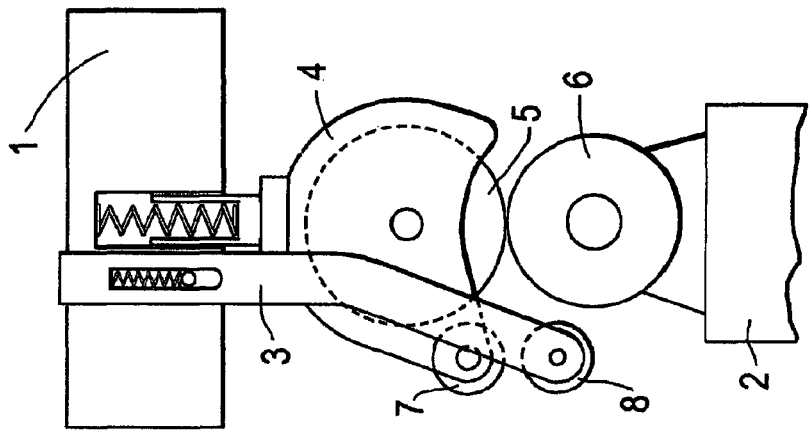
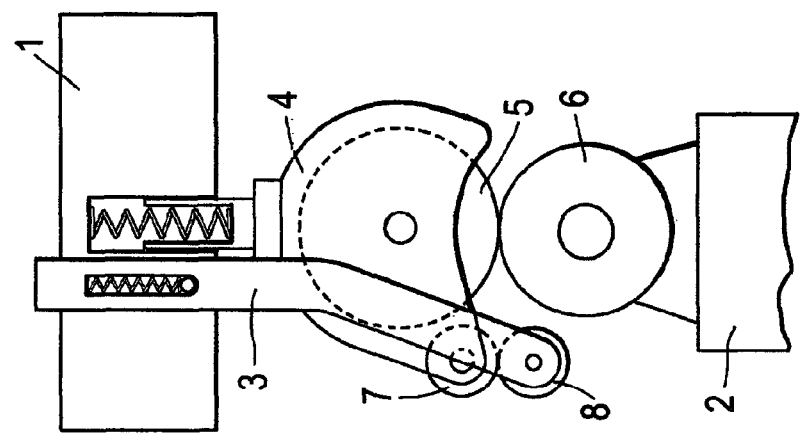

LAMINATING

CROSS-REFERENCE TO RELATED APPLICATIONS

This application is a 371 National Phase of PCT/GB2014/000246 filed on Jun. 23, 2014, which claims priority to Great Britain Patent Application No. Gb1311224.8 filed on Jun. 24, 2013, the entire contents of both of which are incorporated by reference herein.

FIELD

This invention relates to improvements in laminating, and more particularly to an apparatus which will assist in the separation of individual, laminated prints from a continuous line in which top and bottom edges overlap and are joined together by laminating material applied both to the top and bottom of the line.

BACKGROUND

Large prints are laminated by industrial laminating machines which do not use individual envelopes of laminating material for the prints. Instead the prints are fed through the machine with top and bottom edges overlapping and laminating material is drawn to the continuous line of prints from a supply roll above the line or from supply rolls both above and below the line. Having been laminated the individual prints must then be separated. This is done by tearing the leading print from the line across the overlap between its trailing edge and the leading edge of the next print. The tearing is effected by a pair of rolls downstream of the machine which rotate slightly faster than the rolls which have passed the line of prints through the laminating process. This pair of rolls is slightly "skewed" in relation to the direction of movement of the line to produce a tearing effect. If subjected to shear forces the film or films of laminating material will simply stretch without tearing. However if perforated the film will tear with no difficulty. It has therefore been proposed to indent or pierce the film at the position where two prints overlap. In the case of the film applied on top of the prints this has been effected by a toothed wheel applied to the line of prints at a position downstream of where the film is applied to the prints, a support roller engaging the underside of the prints. The toothed wheel indents or pierces the film near to the side of the line of prints which is first subjected to shear forces by the "skewed" pair of rolls.

It has been proposed simultaneously to laminate the underside of the line of prints from a roll of laminating material disposed near to the bottom of the machine. In this case the indenting or piercing of the film has occurred at the supply roll itself. This means that a substantial length of the film is indented or perforated before it reaches the position in which a print is torn off. This is undesirable because the film may tear before it reaches the position in which it is intended to be torn.

A principal object of the present invention is to provide a solution to this problem.

SUMMARY

In accordance with the present invention there is provided apparatus for laminating a line of prints passed substantially horizontally in succession in an overlapping relationship through a laminating machine which applies a continuous laminating film to both the upper and lower side of the line of prints from supply rolls disposed above and below the line, first means being provided downstream of the upper supply roll to pierce or indent the film applied to the upper side of the line of prints at a position where successive prints overlap and means being provided to tear the leading print from the line, characterised in that second means is provided in proximity to said first means downstream of the lower supply roll to pierce or indent the film applied to the lower side of the line of prints.

Preferably the apparatus comprises a toothed wheel downstream of the lower supply roll which rotatably engages the underside of the line near to one of its edges to produce a series of indentations in the film parallel with the longitudinal axis of the line.

A roller with a smooth periphery is preferably applied to the upper side of the line near to the toothed wheel which engages the underside of the line.

The said toothed wheel is preferably displaceable between an operative position in which it will engage the underside of the line and an inoperative position removed from the line.

The said roller is preferably displaceable between an operative position in contact with the top surface of the line and an inoperative position above the line.

The said toothed wheel and the associated roller with a smooth periphery are preferably jointly displaceable between their operative and inoperative positions.

A pair of rolls may be provided which engages opposite sides of the leading print, said pair of rolls rotating faster than rolls which have passed the line through the laminator.

The axes of the said pair of rolls are preferably angularly related to the longitudinal axis of the line and the said position is preferably near to the edge of the line to which the said angle opens.

BRIEF DESCRIPTION OF THE DRAWINGS

A preferred embodiment of the invention will now be described by way of non-limitative example with reference to the accompanying drawings, in which:

FIGS. 1-3 illustrate the same apparatus in accordance with the present invention in three different operating positions, and FIGS. 4 and 5 schematically illustrate in side elevation and plan view a line of overlapping prints to opposite sides of which the indenting wheels 5 and 8 of FIGS. 1-3 are being applied.

DETAILED DESCRIPTION

As is known per se a line of prints 10 are passed along the bed (not shown) of a laminating machine with the trailing edge of a leading print under the leading edge of a successive print. A sheet of laminating material (not shown) is drawn from a roll (not shown) above the line and applied to the top surfaces of the prints. A second sheet of laminating material is drawn from a second roll (not shown) below the line and applied to the undersides of the prints. The prints are thus joined together by the laminating material on both sides of the line.

To separate the individual, laminated prints the line is engaged by a pair of parallel rollers (not shown) rotating slightly faster than those which have moved the line through the laminator. The axes of this pair of rollers are slightly angularly related to the longitudinal axis of the line of prints so that they exert a tearing effect on the laminating material.

Figure 5:
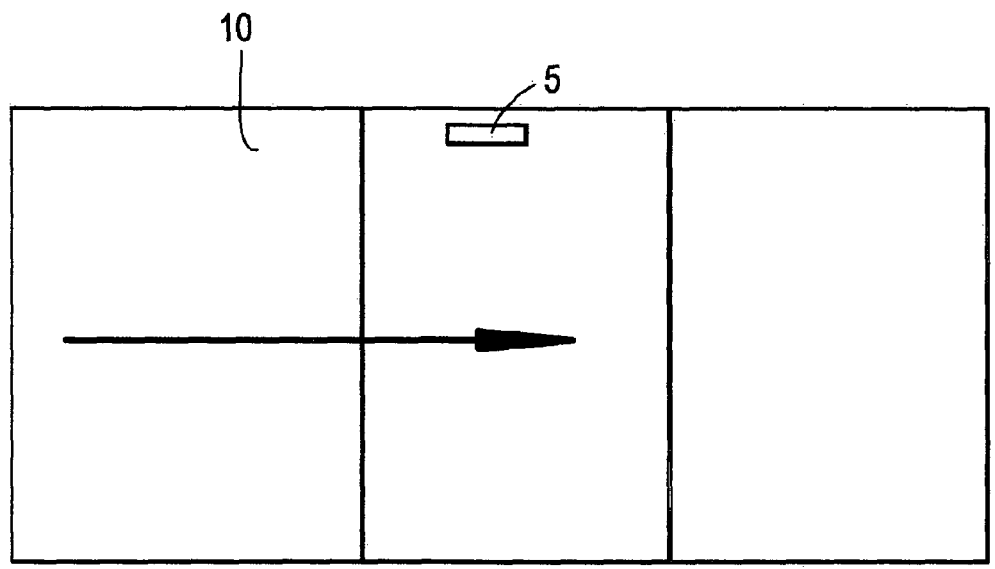

In FIG. 5 the angle of the tearing rollers opens to the top of the page so that the tearing occurs from top to bottom of the line of prints 10 as viewed.

Laminating material will stretch very considerably without tearing but will tear very easily if it is first perforated. The apparatus of FIGS. 1-3 is adapted to indent or perforate the laminating film on both sides of the line of prints.

The apparatus of FIGS. 1-3 is positioned to intercept the line of prints 10 after laminating material has been applied to both sides of the line. A perforating wheel 5 can be brought into contact with the top surface of the line 10 of prints and a perforating wheel 8 can be brought into contact with the underside of the line 10 of prints. A smooth roller 6 supports the underside of the line 10 as its top side is being indented or perforated by the wheel 5 and a smooth roller 7 supports the top surface of the line 10 as its underside is being indented or perforated by the perforating wheel 8.

The perforating wheels 5 and 8 and their associated support rollers 6 and 7 are adjustable toward and away from the line 10 of prints as this passes between them. In the position of FIG. 1 the machine is indenting laminating film on both sides of the line 10 of prints. In the position of FIG. 2 the toothed wheel 8 has been disengaged from the line 10 of prints because laminating material has been applied only to the top surface of the line. In the position of FIG. 3 both toothed wheels 5 and 8 have been disengaged from the line 10 of prints so that no laminating material is indented or perforated.

Figure 4:
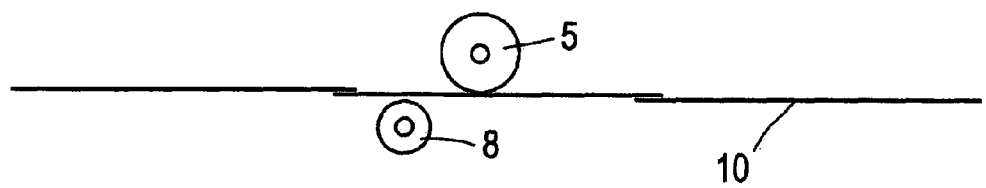

FIGS. 4 and 5 illustrate the situation when laminating material (not shown) applied to the top and bottom surfaces of the line of prints 10 is being indented or perforated by the toothed wheels 5 and 8 (the support rollers 6 and 7 are omitted for clarity). The toothed wheel 5 is making a series of indentations or perforations in the upper film near to the edge of the line 10 at the top of the page as viewed. The toothed wheel 8 is making a series of indentations or perforations in the lower film under those made by the wheel 5.

Tearing rollers (not shown) downstream of the wheels 5 and 8 will tend to tear the individual prints apart from top to bottom of the page as viewed. Because the films of laminating material are indented or perforated they will tear instead of simply stretching.

Positioning of the indenting or perforation wheel 8 in close proximity to the wheel 5 ensures that when film leaves the supply roll below the line of prints it is intact and is only indented or pierced in approximately the same position downstream of the supply rolls as the film applied to the top of the line of prints. This mitigates the possibility that film applied to the underside of the line of prints may be torn prematurely.

What is claimed is:

1. Apparatus for laminating a line of prints passed substantially horizontally in succession in an overlapping relationship through a laminating machine which applies a continuous laminating film to both the upper and lower side of the line of prints from supply rolls disposed above and below the line, first means being provided downstream of the upper supply roll to pierce or indent the film applied to the upper side of the line of prints at a position where successive prints overlap, means being provided to tear the leading print from the line, characterised in that second means is provided in proximity to said first means downstream of the lower supply roll to pierce or indent the film applied to the lower side of the line of prints, the second means comprising a toothed wheel that rotatably engages the underside of the line to produce a series of perforations or indentations in the film parallel with a longitudinal axis of the line.

2. Apparatus as claimed in claim 1, characterised in that the second means engages the underside of the line near to one of its edges.

3. Apparatus as claimed in claim 1, characterised in that a roller with a smooth periphery is applied to the upper side of the line near to the toothed wheel which engages the underside of the line.

4. Apparatus as claimed in claim 3 characterised in that the said roller is displaceable between an operative position in contact with the upper surface of the line and an inoperative position above the line.

5. Apparatus as claimed in claim 4, characterised in that the first means comprises a second toothed wheel that rotatably engages the upper side of the line, the second toothed wheel and the roller being jointly displaceable between operative and inoperative positions.

6. Apparatus as claimed in claim 1, characterised in that the said toothed wheel is displaceable between an operative position in which it engages the underside of the line and an inoperative position removed from the line.

7. Apparatus as claimed in claim 1, characterised in that the means for tearing the leading print from the line comprises a pair of rolls which engages opposite sides of the leading print.

8. Apparatus as claimed in claim 7, wherein the axes of the said pair of rolls are at a skewed angle relative to the longitudinal axis of the line and wherein the said piercing or indenting position is near to the edge of the line to which the said angle opens.

9. An apparatus for laminating a line of prints passed substantially horizontally in succession in an overlapping relationship through a laminating machine which applies a continuous laminating film to both the upper and lower side of the line of prints from supply rolls disposed above and below the line, comprising:
   a first pressing device provided downstream of the upper supply roll to pierce or indent the film applied to the upper side of the line of prints at a position where successive prints overlap a tearing device being provided to tear the leading print from the line; and
   a second pressing device in proximity to the first pressing device to pierce or indent the film applied to the lower side of the line of prints, the second pressing device comprising a toothed wheel that rotatably engages the underside of the line to produce a series of perforations or indentations in the film parallel with a longitudinal axis of the line.

10. The apparatus in claim 9, wherein the second pressing device engages the underside of the line near to one of its edges.

11. The apparatus in claim 9, wherein a roller with a smooth periphery is applied to the upper side of the line near to the toothed wheel which engages the underside of the line.

12. The apparatus in claim 11, wherein the roller is displaceable between an operative position in contact with the upper surface of the line and an inoperative position above the line.

13. The apparatus in claim 12, wherein a toothed wheel of the first pressing device and the roller of the second pressing device are jointly displaceable between operative and inoperative positions.

14. The apparatus in claim 9, wherein the toothed wheel is displaceable between an operative position in which it engages the underside of the line and an inoperative position removed from the line.

15. The apparatus in claim 9, wherein the tearing device comprises a pair of rolls which engages opposite sides of the leading print.

16. The apparatus in claim 15, wherein the axes of the pair of rolls are at a skewed angle relative to the longitudinal axis of the line and wherein the piercing or indenting position is near to the edge of the line to which the angle opens.

\* \* \* \* \*